June 16, 1953
D. VERVEEN
2,641,959
DEVICE FOR MEASURING THE PRINCIPAL
DIMENSIONS OF ERYTHROCYTES
Filed Jan. 9, 1950
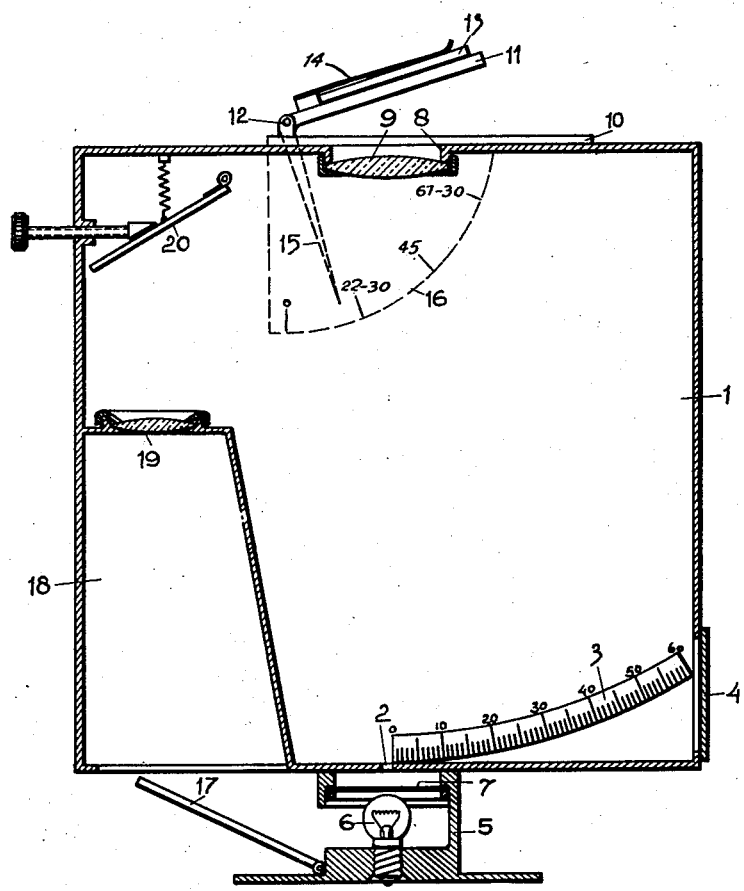
INVENTOR
DIRK VERVEEN
By *Toulmin & Toulmin*
ATTORNEYS.

Patented June 16, 1953

2,641,959

UNITED STATES PATENT OFFICE 2,641,959

DEVICE FOR MEASURING THE PRINCIPAL DIMENSIONS OF ERYTHROCYTES

Dirk Verveen, Aerdenhout, Netherlands

Application January 9, 1950, Serial No. 137,513
In the Netherlands April 28, 1949

2 Claims. (Cl. 88—14)

The present invention relates to a device for measuring the principal dimensions of erythrocytes (hereafter referred to as red blood corpuscles).

Certain diseases are accompanied by a change of the dimensions of the red blood corpuscles, and, in such instances, it will be of great importance to have means available by which the dimensions of these corpuscles, contained in a blood preparation may be quickly and accurately measured. It is, therefore, an object of this invention to provide a simple and accurate device for effecting such measurements. This object has been realized by the device according to the present invention which comprises a box-like structure having an aperture in one wall thereof, a source of light placed behind said aperture, a scale positioned within said box and having its zero point disposed adjacent said aperture, a lens or lens system positioned in the wall opposite said aperture, means for adjustably supporting an object glass above said lens or lens system, and means for projecting a beam of light onto the scale to render it readable through the object glass and lens or lens system.

The device according to one embodiment of this invention, is illustrated in the accompanying drawing.

The device in the example illustrated comprises a small shallow box 1 (measuring say 8 x 8 x 2.5 cm.) having a dull or matt black interior. The lower face of the box is provided with a small aperture 2 in the form of a slot or it may be of circular form having a diameter for example of 0.75 mm., and if desired said aperture may be made adjustable in size in any known manner. In the interior of the box and positioned adjacent the aperture 2 is a scale 3 of flat or curved form and so arranged that it may be taken out or exchanged through a closable aperture 4 provided in the wall of the box. The scale 3 is provided with graduations having the zero-point, disposed adjacent the edge of the aperture 2 as shown.

On the outside of the box 1 below the aperture 2 is a housing 5 for the reception of a monochromatic light source, for example, a sodium lamp 6, or if desired an incandescent lamp may be used, but in this case it is necessary to interpose a monochromatic filter plate 7 between the lamp and the aperture 2.

The upper face of the box 1 is provided, coaxially with the aperture 2, with a larger aperture 8 arranged to receive a lens or lens system 9, the power of which will depend on the dimensions of the apparatus in a manner which will be further described.

Immediately above the lens or lens system 9 on the outer face of the box, is secured a plate 10 upon which is pivotally mounted a carrier 11 pivoted at 12, said carrier being arranged to support an object glass 13 held in position on the carrier by one or more spring strips 14.

The angle of inclination of the carrier 11 and thereby of the object glass 13 may be varied as desired and said angle may be read off by a finger 15 rigidly attached to the carrier 11 moving over a graduated arc 16 forming part of the plate 10 and disposed against the side wall of the box.

As it is necessary for the scale 3 to be visible through the object glass 13 and lens 9, provision is made by means of which said scale may be illuminated. To this end, by way of example, the light rays from the lamp 6 are projected by a mirror 17 upwardly into a compartment 18, partitioned from the interior of the box 1, and through a lens 19 onto a mirror 20 adjustably mounted in the exterior of the box by means of which the beam of light is projected downwardly onto the scale 3.

In order that the scale 3 may be visible and easily readable, the dimensions of the device and the power of the lens 9 are correlated, and to this end, for an apparatus of the size named, a lens of 13 dioptres is chosen, and as the graduations on a flat scale are not always clearly visible over the entire length of the scale, in such a case a scale of curved form is preferably employed.

The graduations or scale divisions on the scale 3 may be executed in half millimeters from 0 to 100, but the dimensions of the blood corpuscles as hereafter described may be read off from said scale in microns, by means of a scale division derived from the Formulae 1 and 2 respectively (hereafter referred to) giving a hyperbolic scale division.

In order to ascertain the dimensions of said corpuscles by means of the herein described device, the following method may be employed.

A drop of blood is placed on the object glass 13 and is spread so thinly thereover that there are areas where the blood-corpuscles are lying beside each other. This preparation is coloured in such a way that the monochromatic light, incident at 2 and the colour of the preparation are complementary colours. If, for example an orange-red light filter 7 is used, the preparation will be coloured green. The preparation is for example covered with a drop of cedar oil to render it transparent, and to protect the surface a cover glass is superimposed thereon. A colourless preparation may also be used, the transparency of which has been improved for example by wetting it with water after fixation of the preparation with methyl alcohol or other suitable spirit and by subsequently covering the same with a cover glass. The object glass thus prepared is now placed in the carrier immediately above the lens 9. On looking through the preparation and through 9 towards the aperture 2 in this case illuminated with an orange-red light, light and dark bands may be perceived, caused by diffraction of the light in the preparation. The light bands are broad, the dark ones narrow. The position of the centre of the first dark band on the scale 3 enables the diameter of the red corpuscles to be calculated according to a formula, mathematically derived by the applicant:

$$d = 1.11 \frac{\lambda}{\sin \alpha} \quad (1)$$

in which $d$ = the sought diameter;
$\lambda$ = the wave length of the monochromatic light;
$\alpha$ = the deflection angle of the first minimum.

If the hyperbolic scale is used the diameter can be read off directly.

In order to measure the thickness of the red corpuscles, the carrier 11 and thereby the object glass is turned through an angle of nearly 90° and the position of the first dark band is read off again on 3. By moving the carrier along the slide 10 the preparation can be adjusted in such a way as to find the most favourable position for the visibility of the bands. Here too the thickness may be calculated according to a formula derived mathematically by the applicant:

$$h = 1.25 \frac{\lambda}{\sin \alpha} \quad (2)$$

in which $h$ = the sought thickness and $\lambda$ and $\alpha$ have the same meaning as above.

The characteristics of the present invention include: the use of monochromatic light; the reading of the scale through the preparation; the measuring of the thickness by placing the carrier 11 at an angle of about 90° and placing the zero point of the scale 3 against the edge of the aperture 2 and not, as might be expected in the centre of 2.

The slide 10 has, beside providing for an adjustment as favourable as possible for the measuring of the thickness, the advantage, together with the possibility of carrier 11 to be angularly adjustable, that the diffractions may be registered photographically when measuring the thickness.

It will be understood that it is of importance that the dark bands and not the light ones are measured.

I claim:

1. In combination in a device for measuring the principal dimensions of red corpuscles in a preparation, comprising a box-like structure having an aperture in one wall thereof, a source of light placed behind said aperture, a scale positioned within said box-like structure at one side of the aperture and having its zero point registering with that edge of said aperture closest to the scale, first lens means positioned in the wall opposite said aperture, means for adjustably supporting an object glass above said lens means, partitioning means mounted in said box-like structure and forming therewith a compartment having an opening at the lower portion thereof, second lens means mounted at the upper portion of said compartment, first reflecting means arranged adjacent said light source for projecting light therefrom into said compartment upon said second lens means, and second reflecting means arranged outside said compartment so as to receive the light passing through said second lens means and projecting said last-mentioned light downwardly upon said scale.

2. A device according to claim 1 in which the said source of light comprises an incandescent lamp and there is interposed between the said lamp and the aperture adjacent to which it is placed a monochromatic filter.

DIRK VERVEEN.

References Cited in the file of this patent

UNITED STATES PATENTS

| Number | Name | Date |
|---|---|---|
| 1,143,675 | Whitney | June 22, 1915 |
| 1,951,523 | Nicolson | Mar. 20, 1934 |
| 1,959,537 | Kuhne | May 22, 1934 |
| 1,974,522 | Twyman et al. | Sept. 25, 1934 |
| 2,322,128 | Hausser et al. | June 15, 1943 |
| 2,355,960 | Duffie | Aug. 15, 1944 |
| 2,519,997 | Brown | Aug. 22, 1950 |

FOREIGN PATENTS

| Number | Country | Date |
|---|---|---|
| 444,435 | Great Britain | Mar. 20, 1936 |
| 490,910 | Great Britain | Aug. 23, 1938 |
| 903,872 | France | Feb. 5, 1945 |